(12) United States Patent
Flynn

(10) Patent No.: US 11,524,914 B1
(45) Date of Patent: Dec. 13, 2022

(54) METHOD AND APPARATUS FOR FORMING A PARISON

(71) Applicant: Owens-Brockway Glass Container Inc., Perrysburg, OH (US)

(72) Inventor: Robin L Flynn, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 261 days.

(21) Appl. No.: 16/555,656

(22) Filed: Aug. 29, 2019

(51) Int. Cl.
*C03B 9/193* (2006.01)

(52) U.S. Cl.
CPC .................. *C03B 9/1932* (2013.01)

(58) Field of Classification Search
CPC .............................. C03B 9/1932; B29C 49/16
See application file for complete search history.

(56) References Cited

U.S. PATENT DOCUMENTS

| | | |
|---|---|---|
| 3,775,079 A | 11/1973 | Sundstrom et al. |
| 4,052,187 A | 10/1977 | Spaeth et al. |
| 4,191,548 A | 3/1980 | Fortner et al. |
| 4,276,073 A * | 6/1981 | Northup ................. C03B 9/3645 65/68 |
| 4,283,215 A | 8/1981 | Sherman |
| 4,336,050 A * | 6/1982 | Northup ................. C03B 9/1932 65/68 |
| 4,367,088 A | 1/1983 | Belletti |
| 4,507,136 A * | 3/1985 | Northup ................. C03B 9/165 65/239 |
| 4,586,944 A * | 5/1986 | Romberg ............. C03B 9/3866 65/110 |
| 4,824,460 A | 4/1989 | Fenton |
| 5,120,341 A * | 6/1992 | Nozawa ................ C03B 9/1932 65/169 |
| 5,900,035 A * | 5/1999 | Hoenig ................. C03B 9/3875 65/83 |
| 6,286,339 B1 * | 9/2001 | DiFrank ............... C03B 9/3825 65/362 |
| 6,698,241 B1 * | 3/2004 | Schwarzer ........... C03B 9/1936 65/29.12 |
| 11,130,700 B2 * | 9/2021 | Cooper ............ C04B 35/62204 |
| 2009/0084799 A1 | 4/2009 | Mondon |
| 2010/0203270 A1 * | 8/2010 | Langsdorf ............... C03B 9/193 428/34.4 |
| 2014/0183152 A1 | 7/2014 | Mondon |

FOREIGN PATENT DOCUMENTS

| | | | | |
|---|---|---|---|---|
| JP | H09328178 A | * | 12/1997 | ........... B65D 1/0223 |
| JP | 2002338261 | | 11/2002 | |

* cited by examiner

*Primary Examiner* — Erin Snelting

(57) ABSTRACT

A method and apparatus for forming a container parison and container are disclosed. The method of forming a container parison in accordance with one aspect of the disclosure includes receiving molten glass in a forming mold having an open upper end, an open lower end, a forming chamber between the open upper and lower ends; supporting the molten glass in the forming mold at the open lower end thereof; and pressing the molten glass in the forming mold with a plunger to form a parison suspended downwardly from the neck finish and out of the open lower end of the mold.

39 Claims, 4 Drawing Sheets

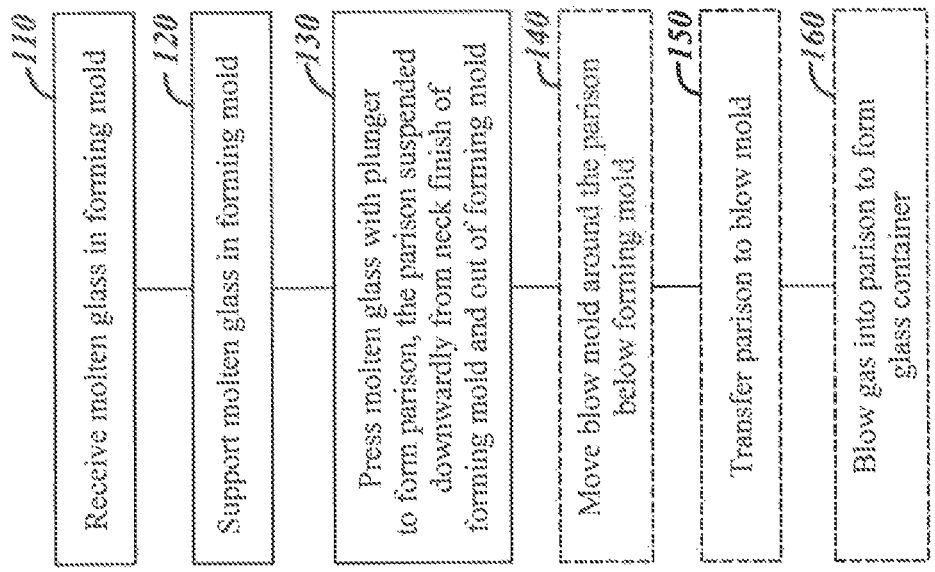
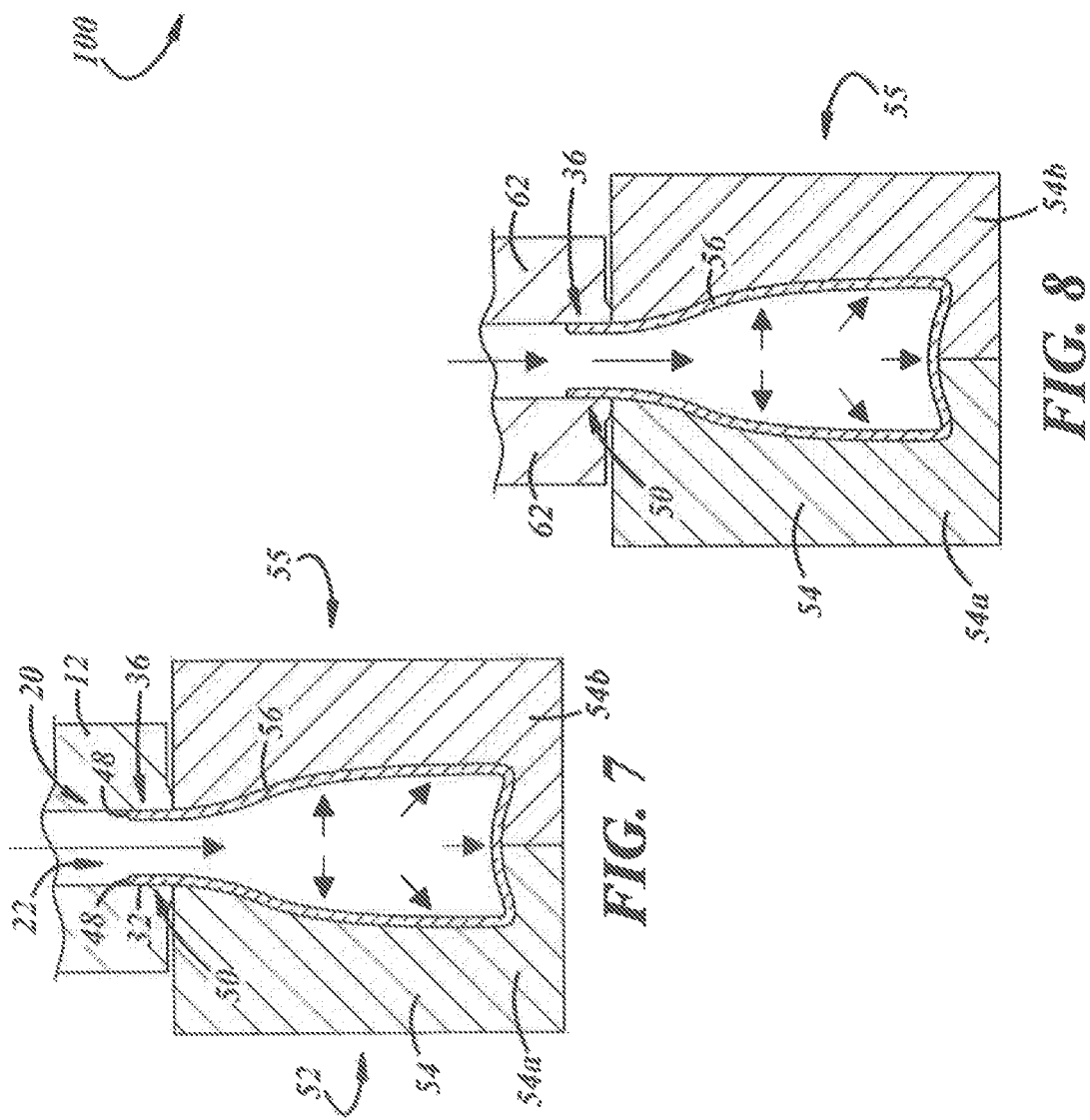

METHOD AND APPARATUS FOR FORMING A PARISON

This patent application discloses systems and methods for glass container manufacturing, and more particularly, systems and methods for forming a glass container by blow molding a glass parison.

BACKGROUND

A parison can include a partially-shaped mass of molten glass formed after a glass furnace and prior to formation of a finished container. Glass container manufacturing processes can include melting glass in a furnace, feeding the molten glass into a blank mold to form a parison, opening the blank mold and inverting the parison while transferring the parison to an open blow mold, closing the blow mold, and blowing the parison against internal walls of the blow mold to form a finished container.

BRIEF SUMMARY OF THE DISCLOSURE

The present disclosure embodies a number of aspects that can be implemented separately from or in combination with each other.

A method of forming a container parison in accordance with one aspect of the disclosure includes receiving molten glass in a forming mold having an open upper end, an open lower end, a forming chamber between the open upper and lower ends; supporting the molten glass in the forming mold at the open lower end thereof; and pressing the molten glass in the forming mold with a plunger to form a parison suspended downwardly from the neck finish and out of the open lower end of the mold.

A container parison forming apparatus in accordance with one aspect of the disclosure includes a forming mold including an open upper end, an open lower end, a forming chamber between the open upper and lower ends; a movable lower plate below the open lower end of the forming mold; and a plunger movable into the open upper end of the forming mold and having a plunger tip extendible out of the lower end of the forming mold during operation.

A container forming system in accordance with one aspect of the disclosure includes a container parison forming apparatus that includes a forming mold including an open upper end, an open lower end, a forming chamber between the open upper and lower ends; a movable lower plate below the open lower end of the forming mold; and a plunger movable into the open upper end of the forming mold and having a plunger tip extendible out of the lower end of the forming mold during operation; and a blow mold movable into a blow molding position below the open lower end of the forming mold.

BRIEF DESCRIPTION OF THE DRAWINGS

The disclosure, together with additional objects, features, advantages and aspects thereof, will be best understood from the following description, the appended claims and the accompanying drawings, in which:

FIG. 7 is a fragmentary cross-sectional view of the container forming system of FIG. 6 showing a glass container formed by blowing the glass parison;

FIG. 8 is a fragmentary cross-sectional view of a blow head and a blow mold that can be used with the container parison forming apparatus and container forming system of FIGS. 1 through 7; and FIG. 9 is a flow diagram showing various steps of an illustrative embodiment of a method for forming a container parison, for example, using the container parison forming apparatus and container forming system of FIGS. 1 through 8.

DETAILED DESCRIPTION

Figure 1:
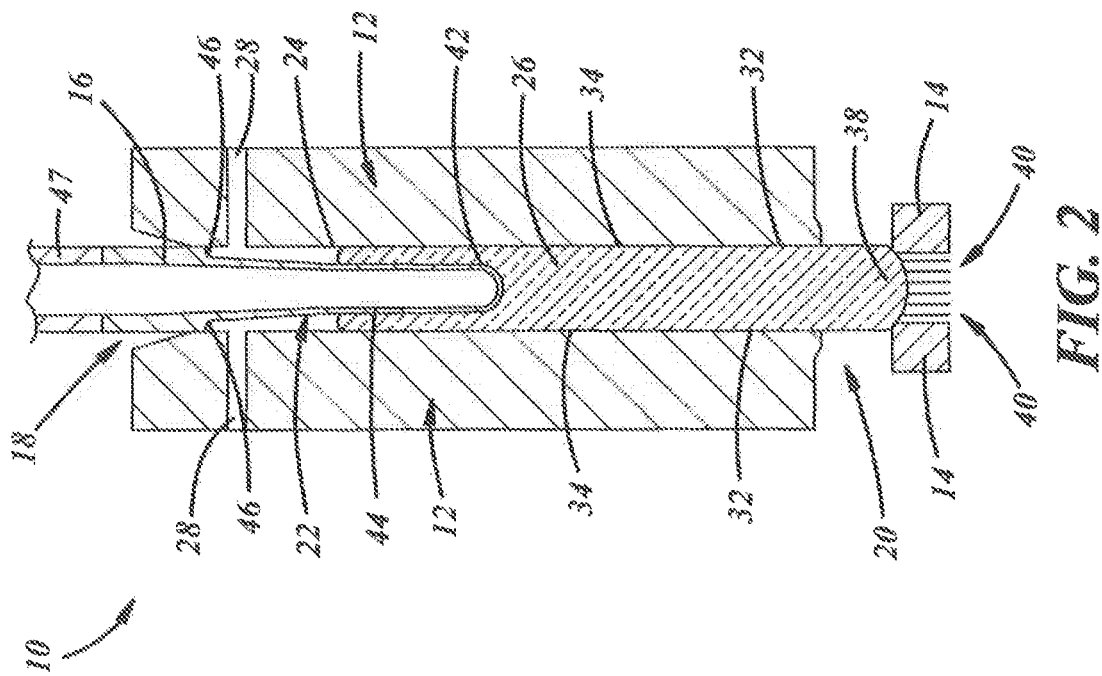
FIG. 1 is a cross-sectional view of a container parison forming apparatus for forming a glass parison in accordance with an illustrative embodiment of the present disclosure, and showing a molten glass gob in the apparatus.
Figure 2:
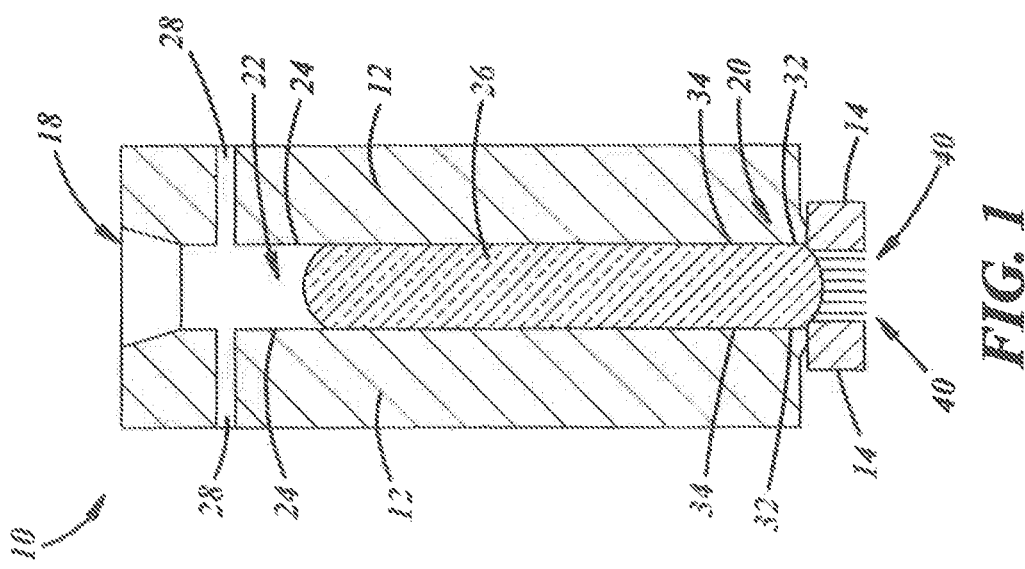
FIG. 2 is a cross-sectional view of the container parison forming apparatus of FIG. 1, showing a plunger pressing the molten glass gob.
Figure 4:
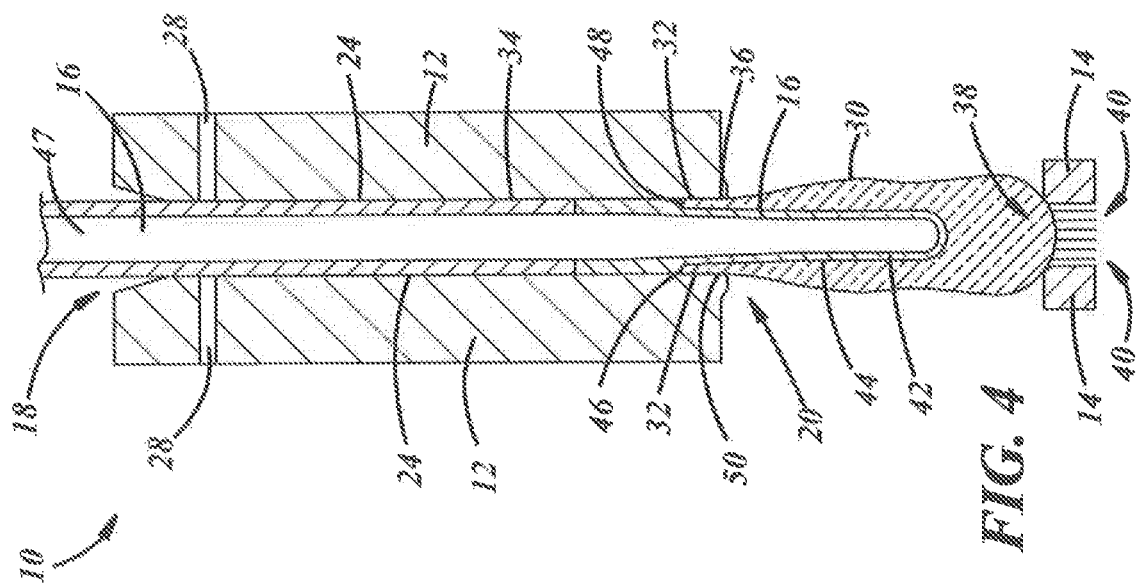
FIG. 4 is a cross-sectional view of the container parison forming apparatus of FIG. 1, showing a parison formed by the plunger pressing the molten glass gob.
Figure 3:
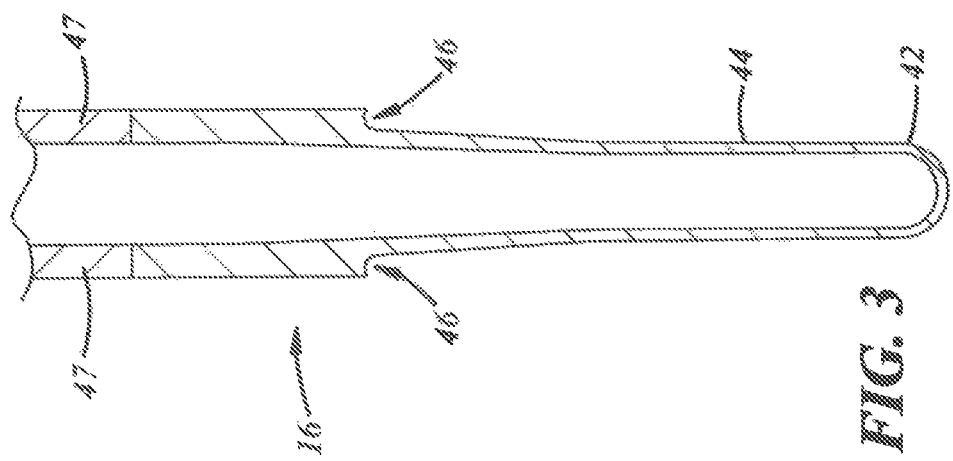
FIG. 3 is a fragmentary cross-sectional view of the plunger shown in FIG. 2.

A general object of the present disclosure, in accordance with at least one aspect of the disclosure, is to provide an apparatus and method for free forming a glass parison using a forming mold. A plunger can be used to push molten glass through a chamber in the forming mold to free form the parison below the forming mold.

Methods for molding glass containers typically include press-and-blow or blow-and-blow processes. For example, a press-and-blow process for molding glass containers usually includes the following steps: feeding a gob of molten glass into a blank mold having a plunger; closing the mold, extending the plunger to press the molten glass against internal walls of the blank mold to form a parison; opening the blank mold and inverting the parison while transferring the parison to an open blow mold; and closing the blow mold and blowing the parison against internal walls of the blow mold to form a finished container. After a parison is inverted and transferred to a blow mold, the parison may be reheated and allowed to elongate for a fixed time at which gas pressure is applied to the parison to form the parison into a container. The feeding of gobs of molten glass to a series of blank molds is typically accomplished by allowing the gobs to slide down a delivery trough via gravity, into the blank molds within a forming machine. However, a gob of molten glass may need to travel a long horizontal distance to reach the blank mold on the far end of a forming machine; to attain the long horizontal distance requires sufficient elevation of the glass gob delivery trough above the blank mold. Also, sufficient vertical space must be provided to allow the equipment to invert the parison between the blank molding process and the blow molding process. Each of these height and space requirements result in a large elevational difference between the glass feeder and the blank mold.

Consequently, the present disclosure is directed to an apparatus and method for forming a glass parison using a forming mold and using a plunger to push molten glass through the forming mold to free form the parison. The apparatus and method disclosed herein can result in reduced equipment height compared to conventional parison forming equipment because the parison is formed directly from the forming mold. Additionally, the need for using a blank mold can be eliminated because the parison is formed directly with the forming mold. Moreover, using the apparatus and method described herein can improve container strength by eliminating blank seams that result from contact between metal of a blank mold and outer surfaces of a parison. Furthermore, using the apparatus and method described herein eliminates the need to invert the parison as in a standard individual section machine because a blow mold can be moved into place around the free-formed parison while the free-formed parison is suspended from the forming mold.

Referring generally to FIGS. 1 through 5, a container parison forming apparatus 10 is shown in accordance with an illustrative embodiment of the present disclosure. The container parison forming apparatus 10 can comprise a split forming mold 12, a movable lower plate 14 disposed below the forming mold 12, and a plunger 16 movable into the forming mold 12.

The forming mold 12 may be configured to receive a gob of molten glass 26 from a glass feeder (not shown). The glass feeder can provide the molten glass 26 for forming a parison 30 (FIG. 4) and controlling the temperature and quantity of the molten glass 26 as it flows from a working end of a furnace and forehearth to a spout and exit of the glass feeder (not shown). The forming mold 12 can comprise an open upper end 18, an open lower end 20, and a forming chamber 22 disposed between the upper end 18 and lower end 20. Additionally, the forming mold 12 can comprise a fully circumferentially continuous sidewall 24. The open upper end 18 can be configured to be disposed proximate to the glass feeder so that when the glass feeder dispenses a gob or stream of molten glass 26, the open upper end 18 receives the molten glass 26 for forming the parison 30. The upper end 18 may include a tapered opening for receiving and/or directing the molten glass 26. The open lower end 20 may include an opening that is opposite from the upper end 18 and can be configured as an exit for the molten glass 26 from the forming mold 12. The open upper end 18, the open lower end 20, and the sidewall 24 define the forming chamber 22 for forming and/or containing the molten glass 26 as it is pushed through the forming mold 12. The forming chamber 22 can generally be cylindrical and adapted to receive, contain, and convey the molten glass 26 from the open upper end 18 to the open lower end 20. In some instances, the forming mold 12 can include a vibration device (not shown) for providing vibration to aid in moving the molten glass 26 through the forming mold 12. For example, the vibration device can be configured to provide ultrasonic, mechanical or other vibration that is transmitted through a forming mold holder.

Additionally, the forming mold 12 may include at least one blow port 28 located proximate to the open upper end 18 for carrying air or other gas into the forming chamber 22 after the parison 30 has been formed. For example, the at least one blow port 28 may include a set of two blow ports disposed proximate to the upper end 18. It is contemplated that the at least one blow port 28 may include a variety of configurations or amounts of blow ports that are suitable for providing a gas into the forming mold 12 and the forming chamber 22. The at least one blow port 28 can be coupled to a gas source (not shown), for example, an air compressor and/or gas tank.

The forming mold 12 can include at least one neck finish feature 32 located proximate to the open lower end 20 and on/in an interior surface 34 of the sidewall 24 of the forming mold 12. The neck finish feature(s) 32 can include features formed and/or machined as a part of the sidewall 24 that can form features on the parison 30 and/or parison neck 36. For example, the neck finish feature(s) 32 can include features that form one or more threads on a finished parison neck 36. The threads can be disposed on a glass container 56 formed from the parison 30, where a container closure (not shown) can be rotated onto the threads. It will be appreciated that the neck finish feature(s) 32 may include other forms or types of features, for example, features configured to form a ring or bead on the parison neck 36 for fastening a container closure to the glass container 56 or for any other purpose.

The movable lower plate 14 may be configured to cover and/or abut the lower end 20 and can be at least partially shaped to form a desired shape of an end 38 of the parison 30. The lower plate 14 can cover the lower end 20 as the molten glass 26 is received into the forming mold 12. The lower plate 14 may include at least one vacuum aperture 40 for providing a vacuum assist in the forming chamber 22 as the molten glass 26 is received. When the molten glass 26 is being received and during gob loading, the lower plate 14 can be in a closed position that covers the open lower end 20 so that the molten glass 26 is supported by the lower plate 14. When used, the vacuum assist may be applied to the forming chamber 22 through the at least one vacuum aperture 40 by a vacuum source (not shown) as the molten glass 26 is loaded/received into the forming chamber and moves toward the lower end 20. After the molten glass 26 is loaded into the forming chamber 22 and supported by the lower plate 14 and/or during initial plunger 16 insertion, the lower plate 14 may be removed and/or slowly moved from the lower end 20 so that the molten glass 26 can exit the forming chamber 22.

The plunger 16 can be axially inserted into the open upper end 18 of the forming mold 12 and forming chamber 22 to press the molten glass 26 at a controlled rate and extrude the molten glass 26 from the lower end 20 into a parison 30. Extruding the molten glass 26 can include using the plunger 16 to axially internally invert the molten glass 26 within and from the forming mold 12 to form it into the parison 30. The plunger 16 can be mounted to and/or controlled by a piston-cylinder unit or a servo drive (not shown), for example, and can be axially raised from and lowered into the forming chamber 22, depending on a desired extrusion rate. Additionally, the container parison forming apparatus 10 may include a vision system and/or an optical sensor (not shown) for determining a position of the plunger 16 and/or for use in controlling the plunger 16. For example, the optical sensor may include a camera system that is configured to monitor the parison shape as it is extruded and to cause automatic adjustment of the plunger speed.

The plunger 16 can comprise a plunger tip 42, a tapered section 44, a sealing surface forming feature 46, and an attachment shaft 47. The plunger 16 can be generally tapered from the tapered section 44 to the plunger tip 42 and can be configured to press into and push the molten glass 26 within the forming mold 12. Additionally, the plunger 16 can be extendible through the forming chamber 22 and out of the lower end 20 of the forming mold 12 during operation. The sealing surface forming feature 46 may be annularly disposed between the tapered section 44 and the attachment shaft 47 and configured to form an annular outer sealing surface 48 proximate to an end of the parison 30. The outer sealing surface 48 may serve to provide a gas or air seal between the parison 30 and the forming mold 12 during a blow molding step and as a surface for mounting a container closure. The sealing surface forming feature 46 and/or the tapered section 44 can also be configured to at least partially provide a seal between the plunger 16 and the interior surface 34 of the forming chamber 22. The plunger 16 can be axially lowered into the forming chamber 22 and pressed into the forming mold 12 and into the molten glass 26 to push the bulk of the molten glass 26 through the forming chamber 22 and past and/or against the neck finish features 32 to form the parison 30 with a neck finish 50 formed by molten glass 26 contact with the neck finish features 32 and a portion of the plunger 16. In this implementation, the forming mold 12 may hold and/or grip the parison 30 using the lower end 20 and/or the neck finish features 32. A portion of the parison 30 can extend outside the forming mold 12 from the lower end 20.

A final parison shape can be controlled by temperature control of the molten glass 26 in the forming mold 12 and of the forming chamber 22, temperature of the plunger 16, timing and rate of removal of the lower plate 14, and/or pressing profile of the plunger 16. In some instances, as the parison 30 is formed and/or shaped, the parison 30 may not be chilled and/or re-heated. Controlling the speed of the plunger 16 may also at least partially determine the final parison shape. For example, a faster plunger speed can provide a thinner parison, while a slower plunger speed can provide a thicker parison. It will be appreciated that other variables may be used to determine final parison shape.

Figure 6:
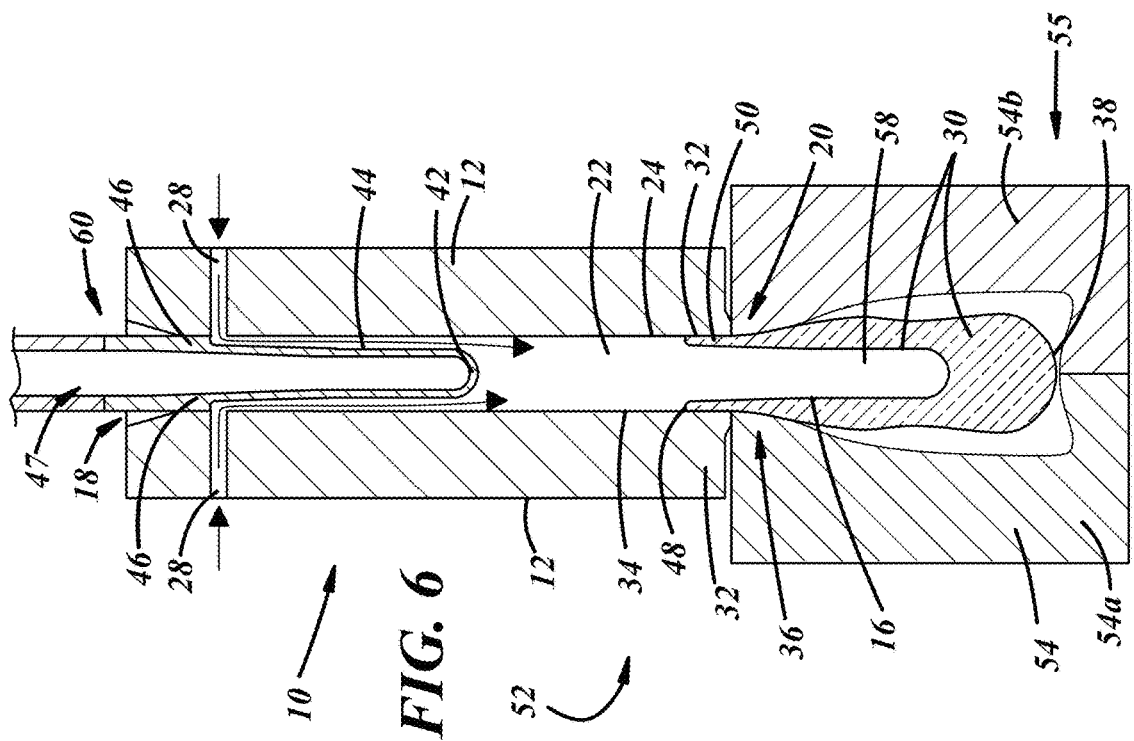
FIG. 6. is a cross-sectional view of a container forming system including the apparatus of FIG. 1, and showing a blow mold around the parison and blow gas being introduced to blow the parison into conformity with the blow mold.
Figure 5:
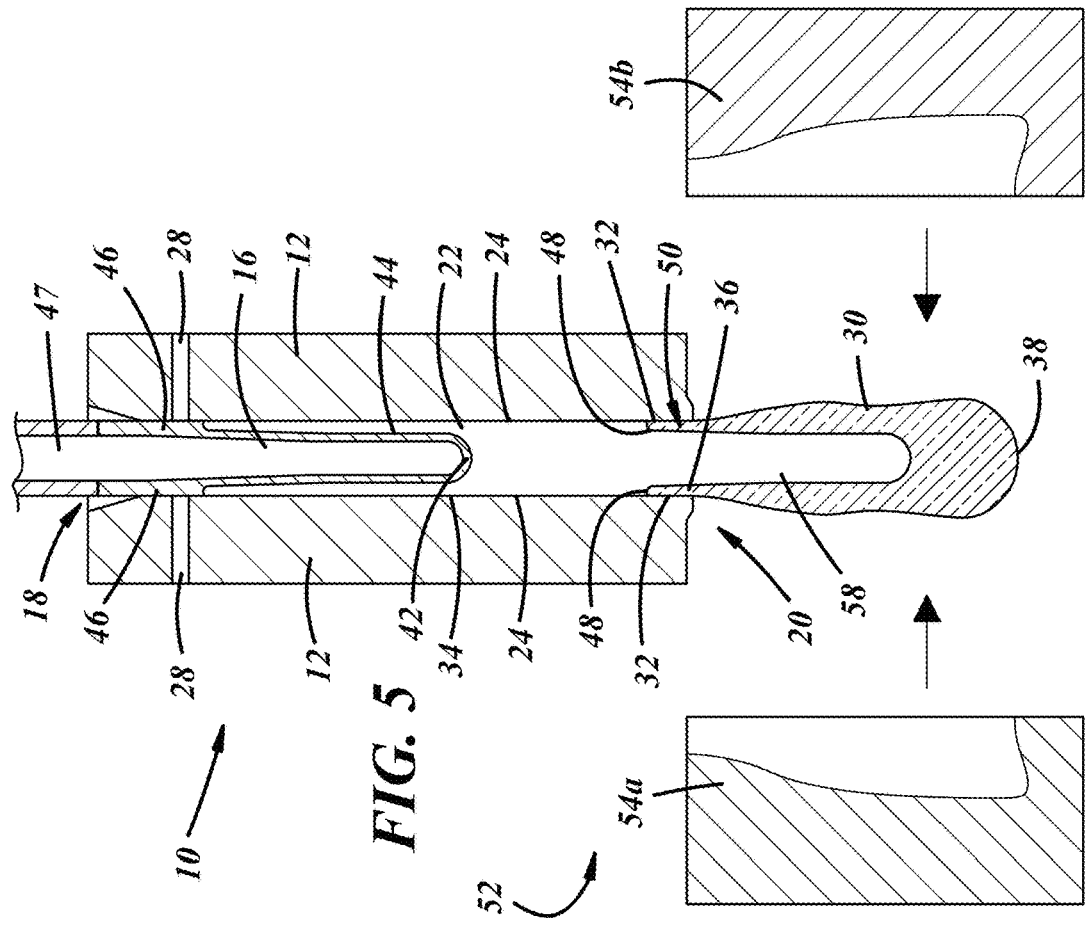
FIG. 5 is a cross-sectional view of the container parison forming apparatus of FIG. 1 showing the plunger being retracted to a blow parison.

As illustrated in FIGS. 5 through 7, a container forming system 52 can include the container parison forming apparatus 10 and a blow mold 54. The blow mold 54 can be configured to move into a blow molding position 55 below the open lower end 20 of the forming mold 12 and around the parison 30 for forming the final shape of the glass container 56. For example, the blow molding position 55 can be directly below the open lower end 20 (e.g., with no intervening equipment between the blow mold 54 and the forming mold 12, directly in contact with the forming mold 12 proximate to the lower end 20, and/or within 0-3 inches of the lower end 20). In some instances, the blow mold 54 may be in the blow molding position 55 during formation of the parison 30.

The blow mold 54 may include cooperating halves 54a, 54b configured to contain at least a portion of the suspended parison 30 while the neck finish 50 is gripped by the forming mold 12. While the blow mold 54 is positioned around the parison 30, the plunger 16 can be disposed in a retracted position 60 where the plunger 16 is not fully removed from the forming mold 12 but at least one blow port 28 is exposed to the forming chamber 22. When the plunger 16 is in the retracted position 60, a gas seal may be created between the plunger 16 and the forming mold 12. In this embodiment, the at least one blow port 28 can provide gas to the forming chamber 22 and to the interior 58 of the parison 30 to blow gas into the parison 30.

In the implementation illustrated in FIG. 5, the parison 30 can be formed while it is extruded from and suspended by the forming mold 12. During formation of the parison 30, the cooperating halves 54a, 54b may be disposed below the forming mold 12 and in an open configuration. A gas, for example air from at least one blow port 28, may be blown into the parison 30 for at least partially forming the parison 30. After parison 30 formation, the cooperating halves 54a, 54b can then be closed around the parison 30 for further forming the parison 30 into the glass container 56.

In the implementation illustrated in FIG. 6, the cooperating halves 54a, 54b can be closed together as the parison 30 is extruded and supported by the forming mold 12. After the parison 30 is formed within the blow mold 54 and the cooperating halves 54a, 54b, the parison 30 can be immediately blown, which may require using lower plate 14 to load the gob and/or molten glass 26 from the glass feeder, immediately removing the lower plate 14 after loading the gob and/or molten glass 26, and then closing the cooperating halves 54a, 54b. A gas, for example air from at least one blow port 28, may be blown into the parison 30 for at least partially forming the parison 30 and/or for at least partially forming the glass container 56 in the blow mold 54, as illustrated in FIG. 7. In the embodiment illustrated in FIG. 8, the forming mold 12 can be removed and a blow head 62 can be positioned over the blow mold 54 for blowing the parison 30 into a finished glass container 56.

Blow mold transfer equipment (not shown) may be coupled to the blow mold 54 and may be configured to position the blow mold 54 into the blow molding position 55. Those of ordinary skill in the art will recognize that the blow mold transfer equipment may include at least one arm that may be coupled to the blow mold and moved by an actuator, for example, a motor of any kind, or any other suitable device that can move the arm.

FIG. 9 illustrates an example of a method 100 for forming a glass parison 30 using a forming mold 12 with neck finish features 32 and using a plunger 16 to free form the parison 30 while simultaneously forming the neck finish 50. For purposes of illustration and clarity, method 100 will be described in the context of the container parison forming apparatus 10 and container forming system 52 described above and generally illustrated in FIGS. 1 through 8. It will be appreciated, however, that the application of the present methodology is not meant to be limited solely to such an arrangement, but rather the method 100 may find application with any number of arrangements (i.e., steps of method 100 may be performed by components of the container parison forming apparatus 10 and container forming system 52 other than those described below, or arrangements of the container parison forming apparatus 10 and container forming system 52 other than that described above).

Method 100 comprises a step 110 of receiving molten glass 26 in a forming mold 12. Receiving molten glass 26 can include using the forming mold 12 to receive a glass gob or a stream of molten glass 26 through the open upper end 18 of the forming mold 12 from, for example, a glass feeder. Receiving the molten glass 26 may also include using and/or creating a vacuum assist through at least one vacuum aperture 40 to evacuate trapped gas/air between the molten glass 26 and the movable lower plate 14 and to assist moving the molten glass 26 as it is received by the forming mold 12 and the forming chamber 22.

Next, method 100 comprises step 120 of supporting the molten glass 26 in the forming mold 12. As illustrated in FIG. 1, supporting the molten glass 26 may include using the movable lower plate 14 to support the molten glass 26. As the molten glass 26 is received, the movable lower plate 14 can be positioned proximate to the open lower end 20 and may abut the forming mold 12 so that the molten glass 26 is contained in the forming chamber 22. Additionally, at least a portion of the interior surface 34 of the forming chamber 22 can be used to support the molten glass 26.

Method 100 includes a step 130 of pressing the molten glass 26 with the plunger 16 to form the parison 30. Pressing the molten glass 26 can include axially inserting the plunger 16 into the forming chamber 22 and into the molten glass 26, where the bulk of the molten glass 26 is pressed through the forming chamber 22 and at least partially toward and/or out of the lower end 20. In some instances, the lower plate 14 may be in place as the molten glass 26 is received and during gob loading and/or during initial plunger insertion. As the plunger 16 presses the molten glass 26, the lower plate 14 may be removed and the molten glass 26 can exit the lower end 20 and form the parison 30. A portion of the forming mold 12 and the neck finish features 32 can grip the parison 30 as the plunger 16 is pressed into the molten glass 26 to form the parison 30 and as the parison 30 is suspended. The parison 30 can be suspended downwardly (e.g., out of the lower end 20 in the direction of gravity) from the neck finish 50. Pressing the molten glass 26 with the plunger 16 can also include forming the neck finish 50 with the neck finish features 32 and/or forming the outer sealing surface 48. As the molten glass 26 is pressed, the plunger 16 can extend out the lower end 20 of the forming mold 12 and can press a portion of the molten glass 26 against the neck finish features 32 resulting in the neck finish 50. The plunger 16 can then be retracted from the resulting parison 30 to a retracted position 60 located proximate to the upper end 18 but still inside the forming chamber 22. Pressing the molten glass 26 with the plunger 16 may occur when the blow mold 54 below the forming mold 12 is in an open configuration or a closed configuration.

In some instances, method 100 may include a step 140 of moving the blow mold 54 around the parison 30 suspended below the forming mold 12. Moving the blow mold 54 can include using blow mold moving equipment (not shown). For example, an actuator can be used to move an arm coupled to the blow mold 54 to position the blow mold 54, which may include positioning cooperating halves of the blow mold 54 so that the parison 30 is contained and/or suspended within the cooperating halves. In one implementation, the parison 30 can be formed while suspended from the forming mold 12, and the blow mold 54 (e.g., cooperating halves 54a, 54b) can be moved by the blow mold moving equipment and closed around the parison 30. The parts of the container forming system 52 (e.g., the forming mold 12, the blow mold 54) may move together to a respective glass feeder, for example using a rotary table and/or a chain driven machine. Also, the plunger 16 may be moved away from the blank mold by any method, including rotation vertically, horizontally or other motion, regulated by a cam or other method, to expose the cavity within the blank mold such that a molten glass gob can be loaded into the cavity; the plunger 16 is then moved back into place above the blank mold for forming of the parison 30.

In some instances, method 100 may include a step 150 of transferring the suspended parison 30 to a blow mold 54. In these implementations, the blow mold 54 may be located away from the forming mold 12, for example at a separate rotary table. Transferring the parison 30 may include using a neck ring and parison transfer equipment (not shown) to move the parison 30 from the forming mold 12 to the blow mold 54. Additionally, transferring the parison 30 may include dropping the formed parison 30 into the blow mold 54 and forming the container 54.

As shown in FIG. 9, method 100 may include a step 160 of blowing gas into the parison 30 to form the glass container 56. Blowing gas can include flowing gas through at least one blow port 28 in the forming mold 12 into the forming chamber 22. For example, air from a compressed air tank can be released through a plurality of blow ports 28 and flow into the forming chamber 22. The plunger 16 can be positioned between the at least one blow port 28 and the open upper end 18 to create an air seal at the upper end 18. The gas can move through the forming chamber 22 and into the interior 58 of the parison 30. The blown gas can push and mold the parison 30 against the blow mold 54 to form the glass container 56. Additionally, blowing gas into the parison 30 to form the glass container 56 may include heating or reheating the parison 30.

There thus has been disclosed an apparatus and method for forming a free form glass parison that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of forming a container parison, comprising:
   receiving molten glass in a forming mold having an open upper end, an open lower end, a forming chamber between the open upper and lower ends;
   supporting the molten glass in the forming mold at the open lower end thereof using a movable lower plate below the open lower end of the forming mold to abut and cover the open lower end of the forming mold in a closed position of the movable lower plate, and being movable away from the open lower end of the forming mold; and
   pressing the molten glass in the forming mold with a plunger to form a parison suspended downwardly from a neck finish and out of the open lower end of the mold, wherein the plunger has a plunger tip extendible out of the lower end of the forming mold.

2. The method of claim 1, wherein the molten glass is in the form of a glass gob.

3. The method of claim 1, wherein the receiving step includes using vacuum to evacuate trapped air in the forming chamber between the molten glass and the movable lower plate.

4. The method of claim 1, wherein the forming mold includes neck finish features proximate the lower end.

5. The method of claim 1, wherein the parison includes a neck finish formed at the lower end of the mold by neck finish features.

6. The method of claim 1, wherein the pressing step includes forming an annular outer sealing surface of the neck finish with a sealing surface forming feature in the plunger.

7. The method of claim 1, wherein, during the pressing step, the movable lower plate moves and supports the molten glass as the plunger presses the molten glass.

8. The method of claim 1, wherein the pressing step includes vibrating the forming mold.

9. The method of claim 1, further comprising partially retracting the plunger from the forming chamber so that gas can be blown through at least one blow port.

10. The method of claim 1, further comprising:
    moving a blow mold into a blow molding position around the parison below the open lower end of the forming mold; and
    blowing gas into the parison to expand the parison into conformity with the blow mold to form a container from the parison.

11. The method of claim 10, wherein the blowing step includes using at least one blow port located proximate to the open upper end to deliver the gas into the parison.

12. The method of claim 1, further comprising:
transferring the parison to a blow mold; and
blowing gas into the parison to expand the parison into conformity with the blow mold to form a container from the parison.

13. A container parison forming apparatus, comprising:
a forming mold including an open upper end, an open lower end, and a forming chamber between the open upper and lower ends;
a movable lower plate below the open lower end of the forming mold to abut and cover the open lower end of the forming mold in a closed position of the movable lower plate, and being movable away from the open lower end of the forming mold; and
a plunger movable into the open upper end of the forming mold and having a plunger tip extendible out of the lower end of the forming mold during operation.

14. The apparatus of claim 13, wherein the forming mold includes at least one blow port located proximate to the open upper end.

15. The apparatus of claim 13, wherein the forming mold includes neck finish features proximate to the lower end.

16. The apparatus of claim 13, wherein the movable lower plate includes at least one vacuum aperture.

17. The apparatus of claim 13, wherein the movable lower plate is at least partially shaped to form an end a parison.

18. The apparatus of claim 13, wherein the plunger includes a sealing surface forming feature for forming an annular outer sealing surface of a parison.

19. The apparatus of claim 13, not including a blank mold.

20. The apparatus of claim 13, wherein the movable lower plate moves away from the open lower end of the forming mold as the plunger moves into the forming mold.

21. The apparatus of claim 13, wherein the movable lower plate is configured to support a gob of molten glass during loading of the gob of molten glass into the forming chamber.

22. The apparatus of claim 13, wherein the movable lower plate is movable from the open lower end of the forming mold after insertion of the plunger into the forming mold.

23. A container forming system, comprising:
a container parison forming apparatus that includes
a forming mold including an open upper end, an open lower end, and a forming chamber between the open upper and lower ends;
a movable lower plate below the open lower end of the forming mold to abut and cover the open lower end of the forming mold in a closed position of the movable lower plate, and being movable away from the open lower end of the forming mold; and
a plunger movable into the open upper end of the forming mold and having a plunger tip extendible out of the lower end of the forming mold during operation; and
a blow mold movable into a blow molding position below the open lower end of the forming mold.

24. The system of claim 23, wherein the forming mold includes at least one blow port located proximate to the open upper end.

25. The system of claim 23, wherein the forming mold includes neck finish features proximate to the lower end.

26. The system of claim 23, wherein the movable lower plate includes at least one vacuum aperture.

27. The system of claim 23, wherein the movable lower plate is at least partially shaped to form an end of a parison.

28. The system of claim 23, wherein the plunger includes a sealing surface forming feature for forming an annular outer sealing surface of a parison.

29. The system of claim 23, wherein the blow mold is in the blow molding position during formation of a parison.

30. The system of claim 29, wherein the lower plate is below the forming mold during gob loading and initial plunger insertion.

31. The system of claim 30, wherein the lower plate is moved from underneath the forming mold and the blow mold is then moved into the blow molding position and closed for formation of the parison.

32. The system of claim 23, wherein the movable lower plate is configured to support a gob of molten glass during loading of the gob of molten glass into the forming chamber.

33. The system of claim 23, wherein the movable lower plate is movable from the open lower end of the forming mold after insertion of the plunger into the forming mold.

34. The system of claim 23, wherein the blow mold is in a blow molding position during formation of a parison.

35. A container parison forming apparatus, comprising:
a forming mold including an open upper end, an open lower end, and a forming chamber between the open upper and lower ends, the forming mold configured to receive molten glass into the open upper end;
a plunger movable into the open upper end of the forming mold and having a plunger tip extendible out of the lower end of the forming mold during operation, the plunger being configured to push the molten glass through the forming chamber and past the open lower end of the forming mold to form a glass parison; and
a movable lower plate below the open lower end of the forming mold to cover the open lower end of the forming mold in a closed position of the movable lower plate, the movable plate supporting the molten glass and being configured to move away from the open lower end of the forming mold as the molten glass is pushed through the forming chamber by the plunger.

36. The apparatus of claim 35, wherein the forming mold includes at least one blow port located proximate to the open upper end.

37. The apparatus of claim 35, wherein the forming mold includes neck finish features proximate to the lower end, the neck finish features being configured to grip the glass parison such that the glass parison, once formed, is suspended from the forming mold.

38. The apparatus of claim 35, wherein the movable lower plate includes at least one vacuum aperture.

39. The apparatus of claim 35, wherein the movable lower plate is at least partially shaped to form an end of a parison.

* * * * *